United States Patent [19]

McAvoy

[11] 3,791,665
[45] Feb. 12, 1974

[54] COVER ASSEMBLY

[76] Inventor: Charles R. McAvoy, 1002 E. Platt, Tampa, Fla. 33602

[22] Filed: May 5, 1972

[21] Appl. No.: 250,605

[52] U.S. Cl............................ 280/150 R, 52/DIG. 3
[51] Int. Cl............................................. B60r 27/00
[58] Field of Search.............. 280/150 R; 52/DIG. 3; 248/74 A; 24/243 B, 259 SH

[56] References Cited
UNITED STATES PATENTS

| | | | |
|---|---|---|---|
| 3,004,769 | 10/1961 | Turner | 280/150 R |
| 3,201,841 | 8/1965 | Carleton | 24/243.2 |
| 3,113,357 | 12/1963 | Reukauf | 280/150 R |
| 2,961,255 | 11/1960 | Trott | 280/150 R |
| 3,042,425 | 7/1962 | Cathey | 280/150 R |

FOREIGN PATENTS OR APPLICATIONS 335,735  1/1959  Switzerland....................... 24/243.7

Primary Examiner—Robert R. Song
Attorney, Agent, or Firm—Stein, Orman & Fisher

[57] ABSTRACT

A cover assembly of the type designed for use in combination with house trailers, mobile homes or like structures comprising one or more skirt-like structures attached about the lower, outer peripheral portion of a house trailer and dimensioned to extend from this portion, vertically downward to approximately the supporting surface on which the mobile home is positioned. The skirt structure is made from a flexible, open meshed material capable of allowing air to pass therethrough and be rolled upon itself when removed from the mobile home. Connecting means are provided in the form of brackets arranged in spaced relation to one another and connected to the mobile home so as to position the skirt structure in abutting relation to the lower, outer peripheral portion of the mobile home. Attachment means comprising an integrally formed rib or a plurality of apertured flanges may be formed on the upper edge of the skirt structure to cooperate with connecting means so as to allow the skirt structure to be removably attached from the mobile home.

7 Claims, 7 Drawing Figures

PATENTED FEB 12 1974　　　　　　　　　　　　　　　3,791,665
FIG. 1
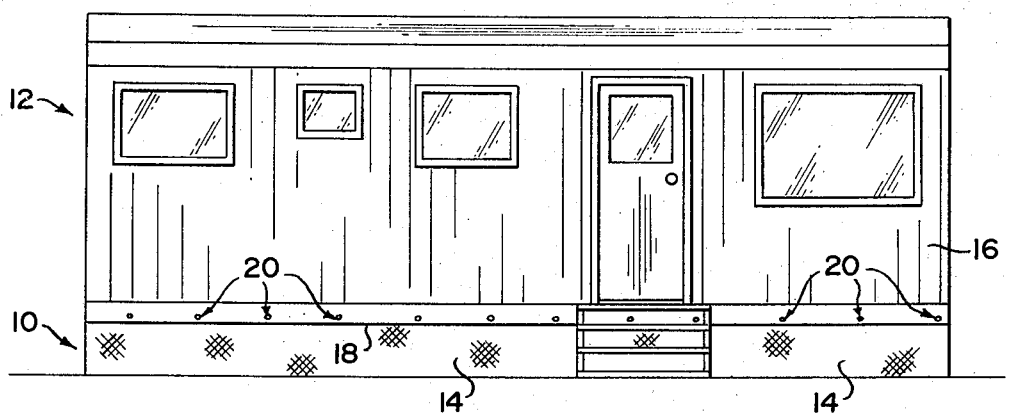
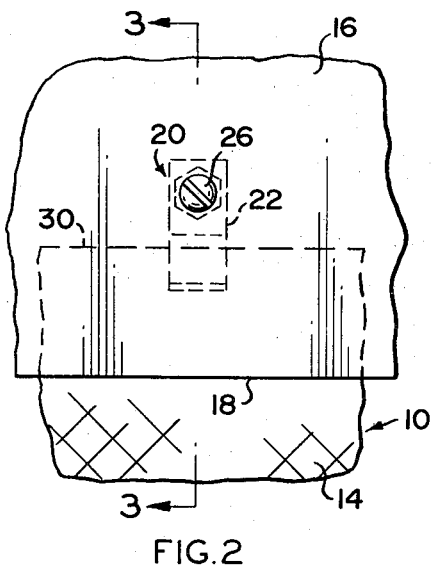
FIG. 2
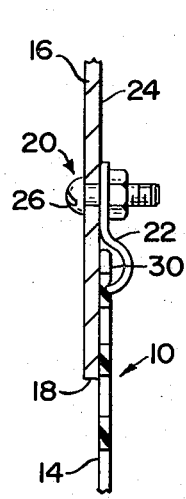
FIG. 3
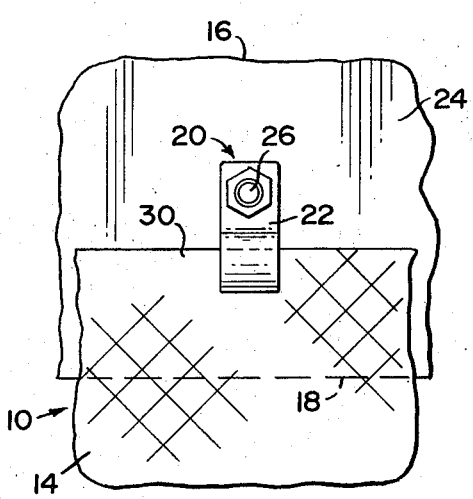
FIG. 4
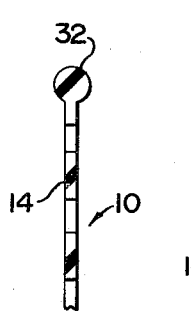
FIG. 5
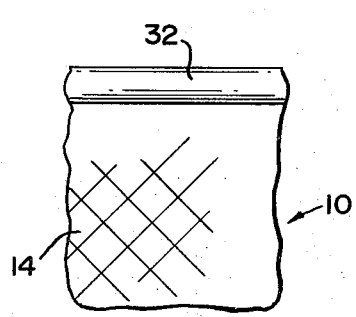
FIG. 6
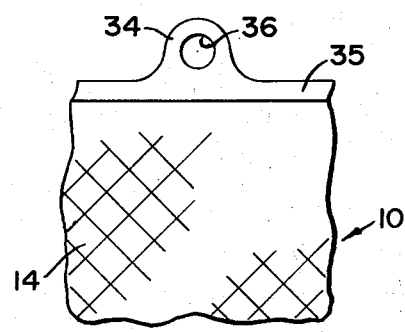
FIG. 7

COVER ASSEMBLY

BACKGROUND OF THE INVENTION

1. Field of the Invention

This invention relates to a skirt like structure removably attached about the lower periphery of a mobile home like structures so as to restrict viewing beneath the mobile home while at the same time allowing air to pass therethrough.

2. Description of the Prior Art

In recent years the popularity of mobile homes primarily in the form of house trailers and the like has greatly increased. Along with this popularity there have been demands by the consuming public to improve both the interior and exterior appearances of such structures. However, various limitations are present in designing, constructing and modifying the structures to improve their decorative appearance. A number of these limitations or problems are due to the mobile nature of these house structures. Because it is common practice to maintain the larger house trailers at a single location for relatively long periods of time, the vast majority of owners of these structures are frequently reluctant to invest in any permanent type "add-on" structure which could not be removed if it is desired to re-locate the mobile home.

When positioning a house trailer or like mobile home type structure in a lot or area for any prolonged period of time various supporting means are positioned underneath the trailer in ground supporting relation thereto. Generally, these devices are unsightly and certainly do not add to the esthetic appearance of the mobile home when viewed by a passerby or the like. In the past, it has been proposed to overcome this unsightliness by providing permanently mounted panels or shields to block off the under space located immediately beneath the trailer. However, one using almost any of the majority of these prior art devices encounter many of the above mentioned problems and limitations. More specifically, use of shields, rigid panels and the like is generally expensive in that these devices are normally permanently mounted thereby prohibiting the easy removal of these devices when it is determined to re-locate the mobile home itself. Similarly, both installation and transportation of the large, relatively heavy panel is extremely troublesome and difficult to accomplish without the use of trained movers or expensive laborers. Storage and transportation facilities needed to move these shields or panels from one location to another is also expensive.

In addition, it is freuqently desirable to have the under space of the mobile home freely accessible to breeze so as to aid in the cooling of the interior of the mobile home. The use of solid panels and the like naturally prohibits the flow of any air current beneath the trailer itself.

Accordingly, it can be seen that there is a need for a device designed primarily for use in combination with a house trailer or mobile home type structure wherein the device serves to add to the decorative appearance of the mobile home by restricting the view of the under area of a mobile home while at the same time allowing air currents and breeze free access thereto.

SUMMARY OF THE INVENTION

This invention relates to a cover assembly in the form of skirt means designed to be removably attached adjacent to the lower, outer peripheral edge or portion of a mobile home, house trailer or similar type structure. Such a skirt means may be mounted substantially about the entire periphery of the mobile home thereby almost entirely eliminating viewing of the under structure including supports of the mobile home. At the same time the cover assembly may be made of material sufficiently porous or providing apertures therein so as to allow air current or breeze to flow under the mobile home thereby providing a cooling effect.

More specifically, the cover assembly includes one or more elongated strips made from a flexible material such as Neoprene, rubber material or any applicable material having sufficient flexibility to be rolled or folded upon itself. This flexibility characteristic allows for easy storage and transportation of the skirt structure since it can be stored in a relatively small space and since it will be light enough to be carried by a single person.

In addition the specific configuration of the skirt means should comprise a plurality of apertures or alternately the material should be sufficiently porous to allow air to pass therebetween for the reasons set forth above. Any such apertures form in the material should be large enough to allow the passage of air therethrough but at the same time should be sufficiently small enough to restrict the viewing of the undersurface of the mobile home. Regardless of the particular configuration or formation of the material itself, this skirt structure can be formed from a single elongated strip or alternately a plurality of shorter, elongated strips arranged end to end in somewhat of a successive fashion.

One feature of the present invention is its mobility. Accordingly, connecting means are provided which are mountable on the mobile home and which engage the skirt means in such a manner as to removably connect it to the outer lower peripheral portion as described above. More particularly, these connecting means may take the form of a plurality of brackets or clips arranged in spaced relation to one another and which may be attached to the mobile home adjacent the lower peripheral portion by means of a conventional screw threaded fastener or the like. These brackets are specifically configured to engage at least an area of the skirt means adjacent to its upper edge at spaced points. Engagement occurs in such a manner as to force this area of the skirt means into abutting relation with the inner surface of the lower, outer peripheral portion of the mobile home thereby allowing the skirt means to appear to be blended in with the exterior walls of the mobile home.

Attachment means may be connected to the skirt means. One embodiment of this attachment means comprises an elongated rib integrally formed so as to at least partially define the upper edge of the skirt means and extend along its entire length. This rib is configured to correspond to the configuration of the bracket thereby the skirt means to abut the lower, outer peripheral portion of the mobile home in the manner described above.

Another embodiment of the attachment means comprises a plurality of outstanding flanges connected to the upper edge of the skirt means in spaced relation to one another. The distance between each of the flanges correspond to the positioning of the bracket or other connecting means applicable for use with these brackets. Along these lines an aperture may be provided in each of the flanges to facilitate connecting of the skirt directly to a conventional screw threaded fastening device rather than to the bracket itself. The flanges can also be configured and apertured to be connected to the mobile home by means of a bracket itself. It should be further noted that the flange may also be integrally formed along the upper edge of the skirt means and may be an extension from the intergrally formed elongated rib described above.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the nature and the objects of the invention, referance should be had to the following detailed description taken in connection with the accompanying drawing in which:

FIG. 1 is a front plan view of a mobile home with the cover assembly of the present invention attached thereto.

FIG. 2 is a detailed cutaway view of the connecting means shown in broken lines and the skirt means attached thereto.

FIG. 3 is a sectional view taken along line 3—3 of FIG. 2.

FIG. 4 is a rear view of the structure shown in FIG. 2.

FIG. 5 is a sectional view of one embodiment of an attachment means connected to the skirt means of the present invention.

FIG. 6 is a front plan view of FIG. 5.

FIG. 7 is a front plan view of another embodiment of the attachment means connected to the skirt means of the present invention.

Similar reference characters refer to similar parts throughout the several views of the drawings.

DETAILED DESCRIPTION

The subject invention relates to a cover assembly generally indicated in FIG. 1 as 10 designed primarily to be used in combination with a house trailer or mobile home like structure generally indicated as 12. As shown, the cover assembly is intended to extend about the lower, outer peripheral portion of the mobile home 12 and can be connected about a portion of or the entire periphery of the mobile home 12.

FIGS. 2–7 show the more specific structural details of the cover assembly 10. As shown in FIGS. 2–4, the cover assembly 10 comprises a skirt means formed from a flexible, open meshed material. The flexibility of the material from which the skirt means 14 is formed should be sufficient to allow the skirt means to be rolled upon itslef or folded thereby providing easy storage when it is removed from the mobile home or before it is mounted thereon. As stated, the material should also be of an open meshed construction or alternately should be of sufficient porosity to allow currents of air to flow therethrough. Regardless of the specific structure of the skirt means used, the aperture in the skirt means should be sufficiently small to prevent viewing of the underneath portion of the trailer while at the same time allowing the air to pass therethrough to aid in the cooling of the trailer.

When installed, the skirt means 14 may be attached to the side wall 16 of the mobile home 12 and more specifically may be forced into abutting relation with the lower outer peripheral portion 18 by a connecting means generally indicated as 20. This connecting means comprises a somewhat hook or arcuate shaped bracket 22 mounted on the inside surface 24 of the side wall 16 by a conventional fastening means 26. The specific configuration of bracket 22 allows it to engage the upper edge 30 of the skirt means in such a manner that the skirt means 14 may be readily removed from the mobile home when desired.

Turning to FIGS. 5–7, an attachment means may be mounted on skirt means 14 so as to be positioned in cooperative relation with bracket 22. One embodiment of the present invention shows the attachment means being in the form of an elongated rib 32 integrally formed and at least partially defining the upper edge 30 of skirt means 14. It can readily be seen that rib 32 can easily cooperate with the configuration of the somewhat arcuate bracket 22.

Another embodiment of the attachment means comprises a plurality of upstanding flanges 34 arranged in spaced relation to one another wherein the distance between each of the flanges 34 corresponds to the location of the plurality of connecting means 20 which are also arranged in spaced relation to one another along the lower outer peripheral portion 18 of side wall 16 as shown in FIG. 1. Each flange 34 may be integrally formed on skirt means 14 and may be an additional extension from a rib 35 whice may or may not be configured similar to the rib 32 shown in the embodiments of FIGS. 5 and 6. Each of the flanges 34 may also include a substantially centrally located aperture 36 designed to cooperate with a conventional fastening means 26 shown in FIG. 3. Accordingly, when the flanges 34 are apertured as shown in FIG. 7 the skrit menas 14 may be removably connected to the inner surface 24 of side wall 16 merely through application of the connecting means 26 rather than bracket 22.

From a review of the above description it can be readily seen that the cover assembly 10 has the advantage of being easily removed from the mobile home 12 when it is desired to re-locate the mobile home or for any other desired reason. Accordingly, skirt means 14 may comprise a single elongated strip attached to the mobile home 12 as shown. Alternately, the skirt means may comprise a plurality of successively arranged elongated strips arranged in somewhat end to end fashion about the entire or at least a portion of the lower peripheral edge or area 18 of the mobile home 12.

It will thus be seen that the objects set forth above among those made apparent from the preceding description are efficiently attained, and since certain changes may be made in the above product without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which is a matter of language, might be said to fall therebetween.

Now that the invention has been described,
What is claimed is:

1. A cover assembly used in combination with a mobile home, said cover assembly comprising: skirt means made from a flexible material, connecting means secured to the mobile home so as to removably mount said skirt means thereon, attachment means integrally formed on said skirt means and configured to operatively engage said connection means, said skirt means dimensioned to extend at least a major portion of the length of the mobile home and to extend at least a major portion of the vertical distance from the lower outer peripheral portion of the mobile home to the supporting surface on which the mobile home is positioned, said connecting means comprising a plurality of brackets disposed in spaced relation to one another and each attached to the inside surface of side wall of said mobile home in spaced relation to a lower peripheral edge thereof, said connecting means including a substantially flat portion and a curvilinear portion integrally attached thereto, said curvilinear portion engaging said skirt adjacent said upper edge and said skirt thereby fixedly disposed into flush engagement with said inside surface along at least a portion of said skirt.

2. A cover assembly as in claim 1 further comprising said skirt means being made from an open meshed material, whereby air is capable of passing through said skirt means when mounted on the mobile home.

3. A cover assembly as in claim 1 wherein each of said plurality of bracket members are connected to the mobile home by screw threaded fastening means.

4. A cover assembly as in claim 1 wherein said attachment means comprises a plurality of apertured flanges mounted on said base in spaced relation to one another and positioned in cooperative relation to said connecting means on the mobile home.

5. A cover assembly as in claim 1 wherein said skirt means comprises a single elongated strip dimensioned to connect along substantially the entire lower, outer peripheral portion of the mobile home.

6. A cover assembly as in claim 1 wherein said skirt means comprises a plurality of elongated strips connected in substantially successive relation about the lower outer peripheral portion of the mobile home.

7. A cover assembly as in claim 1 wherein said attachment means comprises an elongated rib integrally formed on the upper edge along substantially the entire length of said skirt, said rib configured and dimensioned to engage said connection means.

* * * * *